US012798584B2

(12) United States Patent
Nose et al.

(10) Patent No.: US 12,798,584 B2
(45) Date of Patent: *Nov. 17, 2026

(54) VEHICLE CONTROL DEVICE, VEHICLE CONTROL METHOD, AND NON-TRANSITORY RECORDING MEDIUM

(71) Applicant: TOYOTA JIDOSHA KABUSHIKI KAISHA, Toyota (JP)

(72) Inventors: Masashi Nose, Nagoya (JP); Tomoaki Miyazawa, Nagoya (JP); Kazuya Kumazawa, Nagoya (JP); Miki Tsujino, Nagakute (JP); Tsukasa Kitazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/314,596

(22) Filed: Aug. 29, 2025

(65) Prior Publication Data

US 2025/0388213 A1 Dec. 25, 2025

Related U.S. Application Data

(63) Continuation of application No. 18/380,821, filed on Oct. 17, 2023, now Pat. No. 12,434,705.

(30) Foreign Application Priority Data

Nov. 30, 2022 (JP) ................................ 2022-191784

(51) Int. Cl.

*B60W 30/18* (2012.01)
*B60W 50/10* (2012.01)
*G08G 1/16* (2006.01)
*B60W 50/14* (2020.01)

(52) U.S. Cl.

CPC ...... *B60W 30/18163* (2013.01); *B60W 50/10* (2013.01); *G08G 1/167* (2013.01); *B60W 50/14* (2013.01)

(58) Field of Classification Search

CPC ........... B60W 30/18163; B60W 50/10; B60W 50/14; G08G 1/167

See application file for complete search history.

(56) References Cited

U.S. PATENT DOCUMENTS

| | | | | |
|---|---|---|---|---|
| 10,059,334 | B1 * | 8/2018 | Zhu | G08G 1/096725 |
| 10,678,259 | B1 * | 6/2020 | Ferguson | G06T 7/001 |
| 11,603,115 | B1 * | 3/2023 | Heckmann | B60K 28/14 |
| 12,434,705 | B2 * | 10/2025 | Nose | B60W 30/18163 |

(Continued)

*Primary Examiner* — Hussein Elchanti

(74) *Attorney, Agent, or Firm* — Oliff PLC

(57) ABSTRACT

A vehicle control device includes a processor which, when an operation member operable by an occupant of a vehicle has been operated, causes the vehicle to execute lane change assistance control, wherein the processor: executes first lane change assistance control that moves the vehicle from a travel lane, which is a lane in which the vehicle is traveling, to an adjacent lane when a first operation has been executed with respect to the operation member; and executes second lane change assistance control that moves the vehicle from the travel lane to a distant lane, which is a lane on the opposite side of the travel lane across the adjacent lane, when a second operation different from the first operation has been executed with respect to the operation member.

6 Claims, 11 Drawing Sheets

(56) References Cited

U.S. PATENT DOCUMENTS

| | | | | |
|---|---|---|---|---|
| 2005/0015203 | A1* | 1/2005 | Nishira | B60W 50/16 340/436 |
| 2011/0087433 | A1* | 4/2011 | Yester | G08G 1/096716 701/469 |
| 2012/0059789 | A1* | 3/2012 | Sakai | G08G 1/166 706/52 |
| 2012/0313806 | A1* | 12/2012 | Katoh | G01S 13/931 342/52 |
| 2016/0137208 | A1* | 5/2016 | Powers | G08G 1/096725 701/36 |
| 2017/0320521 | A1* | 11/2017 | Fujita | B62D 15/0255 |
| 2018/0354518 | A1* | 12/2018 | Inou | B60W 60/00272 |
| 2019/0071099 | A1* | 3/2019 | Nishiguchi | B60W 50/12 |
| 2019/0084572 | A1* | 3/2019 | Oishi | B60Q 1/40 |
| 2019/0333370 | A1* | 10/2019 | Malkes | G06V 40/103 |

* cited by examiner

VEHICLE CONTROL DEVICE, VEHICLE CONTROL METHOD, AND NON-TRANSITORY RECORDING MEDIUM

CROSS-REFERENCE TO RELATED APPLICATION

This is a Continuation of U.S. patent application Ser. No. 18/380,821, filed Oct. 17, 2023, which is based on and claims priority under 35 USC § 119 from Japanese Patent Application No. 2022-191784 filed on Nov. 30, 2022, the disclosure of which is incorporated by reference herein.

BACKGROUND

Technical Field

The present disclosure relates to a vehicle control device, a vehicle control method, and a non-transitory recording medium.

Related Art

Japanese Patent Application Laid-open (JP-A) No. 2018-103767 discloses a vehicle including a turn signal lever (a blinker lever). When the turn signal lever of the vehicle is moved to a predetermined position, a control device of the vehicle causes the vehicle to execute lane change assistance control (LCA).

Here, suppose that the vehicle is traveling in the leftmost lane of a road having three lanes. Moreover, suppose that an occupant uses LCA to move the vehicle to the middle lane in the left and right direction and move the vehicle from the middle lane to the rightmost lane. In this case, when the occupant moves the turn signal lever to the predetermined position when the vehicle is traveling in the leftmost lane, the vehicle is moved to the middle lane by LCA. Moreover, when the occupant moves the turn signal lever to the predetermined position when the vehicle is traveling in the middle lane, the vehicle is moved to the rightmost lane by LCA.

In this way, in the technology disclosed in JP-A No. 2018-103767, when the occupant wants the vehicle to execute LCA over multiple lanes, the occupant needs to operate the turn signal lever before LCA starts and after LCA starts.

In view of the above circumstances, it is an object of the present disclosure to obtain a vehicle control device, a vehicle control method, and a non-transitory recording medium that enable a vehicle to execute lane change assistance control over multiple lanes without an occupant having to operate an operation member after the lane change assistance control starts.

SUMMARY

A vehicle control device of a first aspect includes a processor which, when an operation member operable by an occupant of a vehicle has been operated, causes the vehicle to execute lane change assistance control, wherein the processor: executes first lane change assistance control that moves the vehicle from a travel lane, which is a lane in which the vehicle is traveling, to an adjacent lane when a first operation has been executed with respect to the operation member; and executes second lane change assistance control that moves the vehicle from the travel lane to a distant lane, which is a lane on an opposite side of the adjacent lane from the travel lane across the adjacent lane, when a second operation different from the first operation has been executed with respect to the operation member.

The processor of the vehicle control device of the first aspect executes the first lane change assistance control that moves the vehicle from the travel lane, which is the lane in which the vehicle is traveling, to the adjacent lane when the first operation has been executed with respect to the operation member.

Moreover, the processor of the vehicle control device of the first aspect executes the second lane change assistance control that moves the vehicle from the travel lane to the distant lane when the second operation different from the first operation has been executed with respect to the operation member. For that reason, according to the vehicle control device of the first aspect, the vehicle can execute lane change assistance control over multiple lanes without the occupant having to operate the operation member after the lane change assistance control starts.

A vehicle control device of a second aspect is the first aspect, wherein the operation member includes a turn signal lever that is movable between an initial position and an operation position, the first operation is an operation of moving the turn signal lever to the operation position and positioning the turn signal lever in the operation position for a period of time less than a first threshold value and equal to or greater than a predetermined value, and the second operation is an operation of moving the turn signal lever to the operation position and positioning the turn signal lever in the operation position for a period of time equal to or greater than the first threshold value.

According to the vehicle control device of the second aspect, when the occupant wants the vehicle to execute lane change assistance control over multiple lanes, the occupant need only execute one time an operation of moving the turn signal lever from the initial position to the operation position and positioning the turn signal lever in the operation position for a period of time equal to or greater than the first threshold value. That is, according to the vehicle control device of the second aspect, the vehicle can execute lane change assistance control over multiple lanes without the occupant having to operate the turn signal lever after the lane change assistance control starts.

A vehicle control device of a third aspect is the first aspect, wherein the operation member includes a switch that is provided on a steering wheel of the vehicle and movable between an initial position and an operation position, the first operation is an operation of moving the switch to the operation position and positioning the switch in the operation position for a period of time less than a first threshold value and equal to or greater than a predetermined value, and the second operation is an operation of moving the switch to the operation position and positioning the switch in the operation position for a period of time equal to or greater than the first threshold value.

According to the vehicle control device of the third aspect, when the occupant wants the vehicle to execute lane change assistance control over multiple lanes, the occupant need only execute one time an operation of moving the switch from the initial position to the operation position and positioning the switch in the operation position for a period of time equal to or greater than the first threshold value. That is, according to the vehicle control device of the third aspect, the vehicle can execute lane change assistance control over multiple lanes without the occupant having to operate the switch after the lane change assistance control starts.

A vehicle control device of a fourth aspect is the first aspect, wherein the processor determines, when the second operation has been executed with respect to the operation member of the vehicle traveling on an expressway, whether or not a predetermined area of the expressway including the current position of the vehicle has an exit for the expressway and includes a connecting lane connected to the distant lane, and the vehicle control device includes a warning generation device that issues a warning when the processor has determined that the predetermined area includes the connecting lane.

In the vehicle control device of the fourth aspect, when the second operation has been executed with respect to the operation member of the vehicle traveling on an expressway, the processor determines whether or not the predetermined area of the expressway including the current position of the vehicle has an exit for the expressway and includes a connecting lane connected to the distant lane. Moreover, the warning generation device issues a warning when the processor has determined that the predetermined area includes the connecting lane. In this way, the vehicle control device of the fourth aspect can issue to the occupant a warning asking the occupant whether it is alright to drive the vehicle toward the exit when the second operation has been executed with respect to the operation member of the vehicle traveling on the expressway.

A vehicle control device of a fifth aspect is the first aspect, wherein the processor determines, when the second operation has been executed with respect to the operation member of the vehicle while traveling on a road, whether or not a predetermined area of the road including the current position of the vehicle includes the adjacent lane and the distant lane, and the processor causes the vehicle to execute the first lane change assistance control when it has determined that the predetermined area includes the adjacent lane but does not include the distant lane.

In the vehicle control device of the fifth aspect, when the second operation has been executed with respect to the operation member, the processor determines whether or not the road on which the vehicle is traveling includes the adjacent lane and the distant lane. Moreover, the processor executes the first lane change assistance control so that the vehicle moves to the adjacent lane when it has determined that the predetermined area includes the adjacent lane but does not include the distant lane. In this way, the vehicle control device of the fifth aspect can execute safe lane change assistance control taking into account misapprehensions relating to the lanes by the occupant.

A vehicle control method of a sixth aspect is a vehicle control method whereby a processor provided in a vehicle: executes first lane change assistance control that moves the vehicle from a travel lane, which is a lane in which the vehicle is traveling, to an adjacent lane when a first operation has been executed with respect to an operation member operable by an occupant of the vehicle; and executes second lane change assistance control that moves the vehicle from the travel lane to a distant lane, which is a lane on an opposite side of the adjacent lane from the travel lane, when a second operation different from the first operation has been executed with respect to the operation member.

A non-transitory recording medium of a seventh aspect stores a program executable by a computer to execute a process, the process including: executing, when a first operation has been executed with respect to an operation member operable by an occupant of a vehicle, first lane change assistance control that moves the vehicle from a travel lane, which is a lane in which the vehicle is traveling, to an adjacent lane; and executing, when a second operation different from the first operation has been executed with respect to the operation member, second lane change assistance control that moves the vehicle from the travel lane to a distant lane, which is a lane on the opposite side of the travel lane across the adjacent lane.

As described above, the vehicle control device, the vehicle control method, and the non-transitory recording medium pertaining to the present disclosure have the excellent effect that a vehicle can execute lane change assistance control over multiple lanes without an occupant having to operate an operation member after the lane change assistance control starts.

BRIEF DESCRIPTION OF THE DRAWINGS

An exemplary embodiment of the present disclosure will be described in detail based on the following figures, wherein.

DETAILED DESCRIPTION

Figure 1:
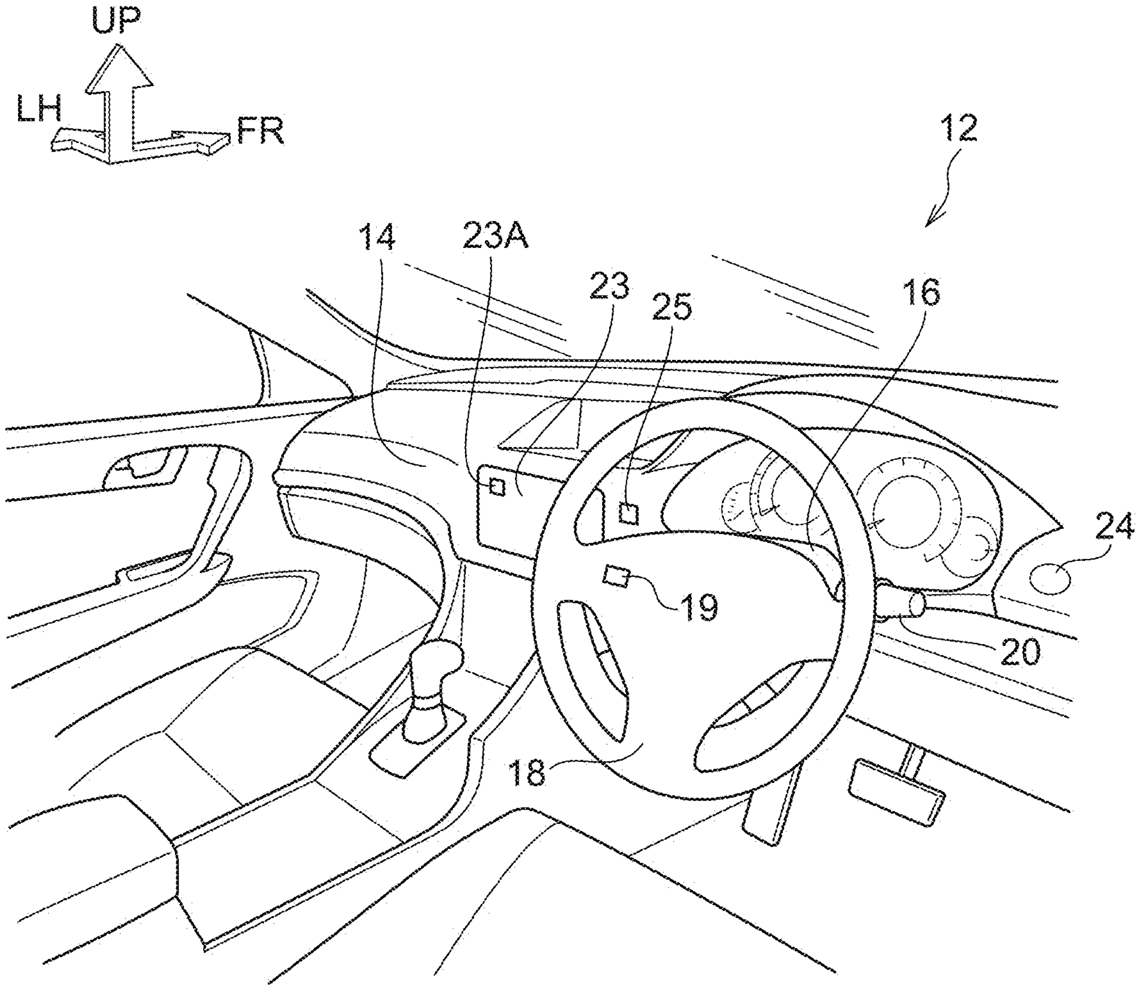
FIG. 1 is a view showing the interior of a vehicle including a vehicle control device pertaining to the embodiment.

An embodiment of a vehicle control device, a vehicle control method, and a non-transitory recording medium pertaining to the present disclosure will be described below with reference to the drawings. Arrow FR appropriately shown in the drawings indicates a frontward direction in a vehicle front and rear direction, arrow LH indicates a leftward direction in a vehicle left and right direction, and arrow UP indicates an upward direction in a vehicle up and down direction.

A vehicle 12 in which a vehicle control device 10 is installed includes an instrument panel 14 as shown in FIG. 1. The instrument panel 14 is provided with a steering column 16, and a steering wheel 18 is rotatably supported on the steering column 16. Moreover, on the right side portion of the steering column 16, a turn signal lever (an operation member) 20 is movably supported.

The turn signal lever 20 is rotatable about its base end portion (left end portion) upward (in a counterclockwise direction) and downward (in a clockwise direction) relative to the steering column 16. The position indicated by reference sign P0 in FIG. 2 (refer to the solid lines) is an initial position of the turn signal lever 20. When the turn signal lever 20 is positioned in the initial position, an axis 20X of the turn signal lever 20 is substantially parallel to the horizontal direction (the left and right direction).

When a driver (an occupant; not shown in the drawings) of the vehicle 12 applies external force to the turn signal lever 20, the turn signal lever 20 rotates to an LCA operation position (an operation position) P1L or an LCA operation position (an operation position) P1R. When the turn signal lever 20 moves to the LCA operation position P1L, a left turn signal (a direction indicator) 22L (see FIG. 3) that is a lamp provided in the front end portion of the vehicle 12 lights up, and when the turn signal lever 20 moves to the LCA operation position P1R, a right turn signal (a direction indicator) 22R (see FIG. 3) that is a lamp provided in the front end portion of the vehicle 12 lights up. Moreover, when the external force that had been applied to the turn signal lever 20 positioned in the LCA operation position P1L or the LCA operation position P1R goes away, the turn signal lever 20 automatically moves and returns to the initial position P0.

Moreover, when the driver applies force to the turn signal lever 20, the turn signal lever 20 rotates to a lighting position P2L or a lighting position P2R. When the turn signal lever 20 moves to the lighting position P2L, the left turn signal 22L lights up, and when the turn signal lever 20 moves to the lighting position P2R, the right turn signal 22R lights up.

Figure 3:
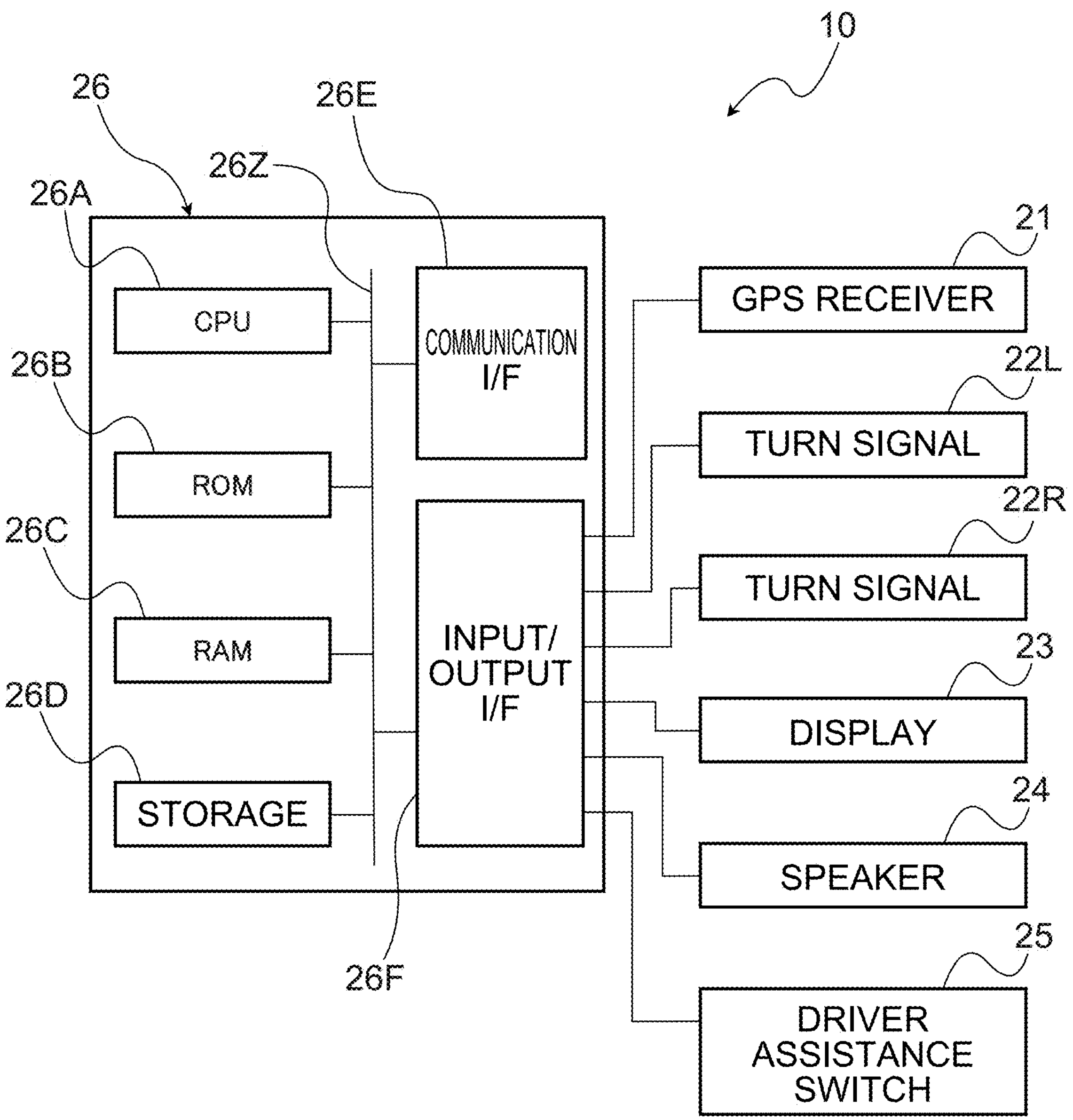
FIG. 3 is a diagram showing hardware configurations of the vehicle shown in FIG. 1.

As shown in FIG. 3, the vehicle 12 has a global positioning system (GPS) receiver 21. The GPS receiver 21 acquires information (hereinafter called "position information") relating to the position where the vehicle 12 is traveling by receiving GPS signals sent from GPS satellites.

Figure 2:
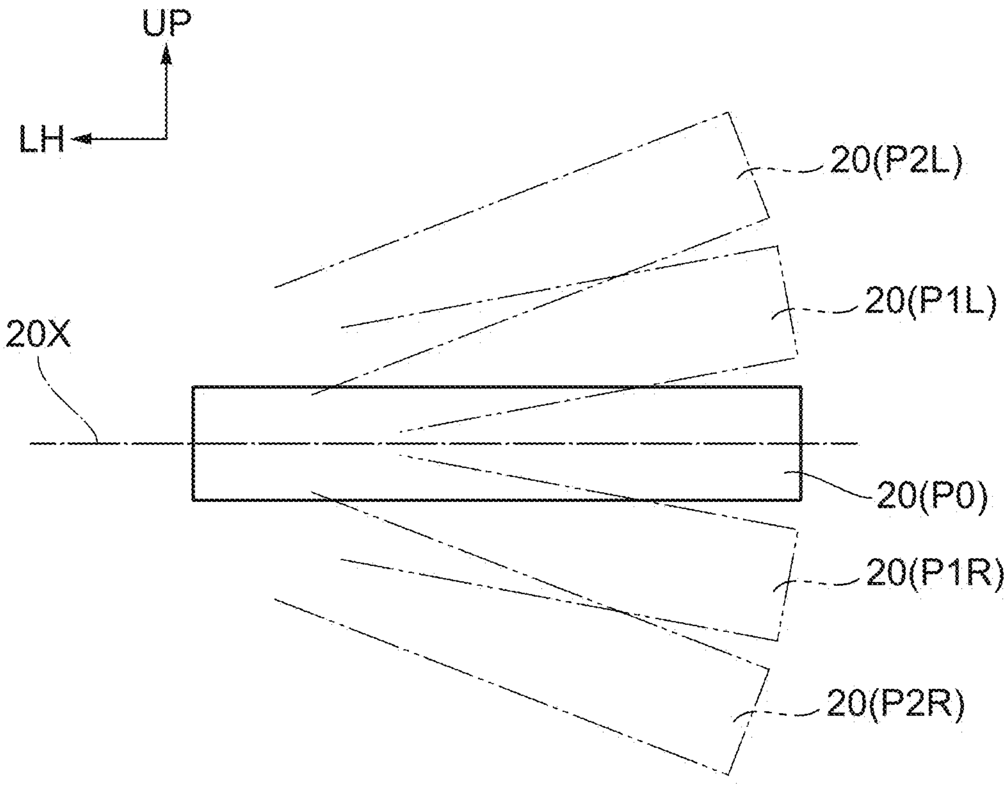
FIG. 2 is a schematic diagram showing the operation of a turn signal lever shown in FIG. 1.

As shown in FIG. 1 and FIG. 2, the instrument panel 14 is provided with a display (a warning generation device) 23 and a speaker (a warning generation device) 24. The instrument panel 14 is also provided with a driver assistance operation device 25. The driver assistance operation device 25 is a device for causing the vehicle 12 to execute driver assistance control described later. When the driver assistance operation device 25 is in an ON state, the vehicle 12 is able to execute driver assistance control. When the driver assistance operation device 25 is in an OFF state, the vehicle 12 is unable to execute driver assistance control.

As shown in FIG. 3, the vehicle 12 has an electronic control unit (ECU) 26 as a hardware configuration.

The ECU 26 is configured to include a central processing unit (CPU) (a processor) (a control unit) (a first determination unit) (a second determination unit) (a computer) 26A, a read-only memory (ROM) (a non-transitory recording medium) (a recording medium) 26B, a random-access memory (RAM) 26C, a storage (a non-transitory recording medium) (a recording medium) 26D, a communication interface (I/F) 26E, and an input/output interface (I/F) 26F. The CPU 26A, the ROM 26B, the RAM 26C, the storage 26D, the communication interface 26E, and the input/output interface 26F are communicably connected to each other via an internal bus 26Z.

The CPU 26A is a central arithmetic processing unit, executes various types of programs, and controls each part of the ECU 26. The CPU 26A reads programs from the ROM 26B or the storage 26D and executes the programs using the RAM 26C as a workspace. The CPU 26A controls each configuration and performs various types of arithmetic processing in accordance with the programs recorded in the ROM 26B or the storage 26D.

The ROM 26B stores various types of programs and various types of data. The RAM 26C temporarily stores programs or data as a workspace. The storage 26D is configured by a storage device such as a hard disk drive (HDD) or a solid-state drive (SSD) and stores various types of programs and various types of data. For example, in the ROM 26B or the storage 26D, a navigation application having map data is installed. That is, a navigation system is installed in the vehicle 12.

The communication interface 26E is an interface for connecting to ECUs (not shown in the drawings) separate from the ECU 26 via an external bus (not shown in the drawings). The interface uses, for example, the CAN communication protocol.

The input/output interface 26F is an interface for communicating with various devices. These devices include the GPS receiver 21, the turn signals 22L, 22R, the display 23, the speaker 24, the driver assistance operation device 25, a sensor group (described later), and an actuator group (described later).

Figure 4:
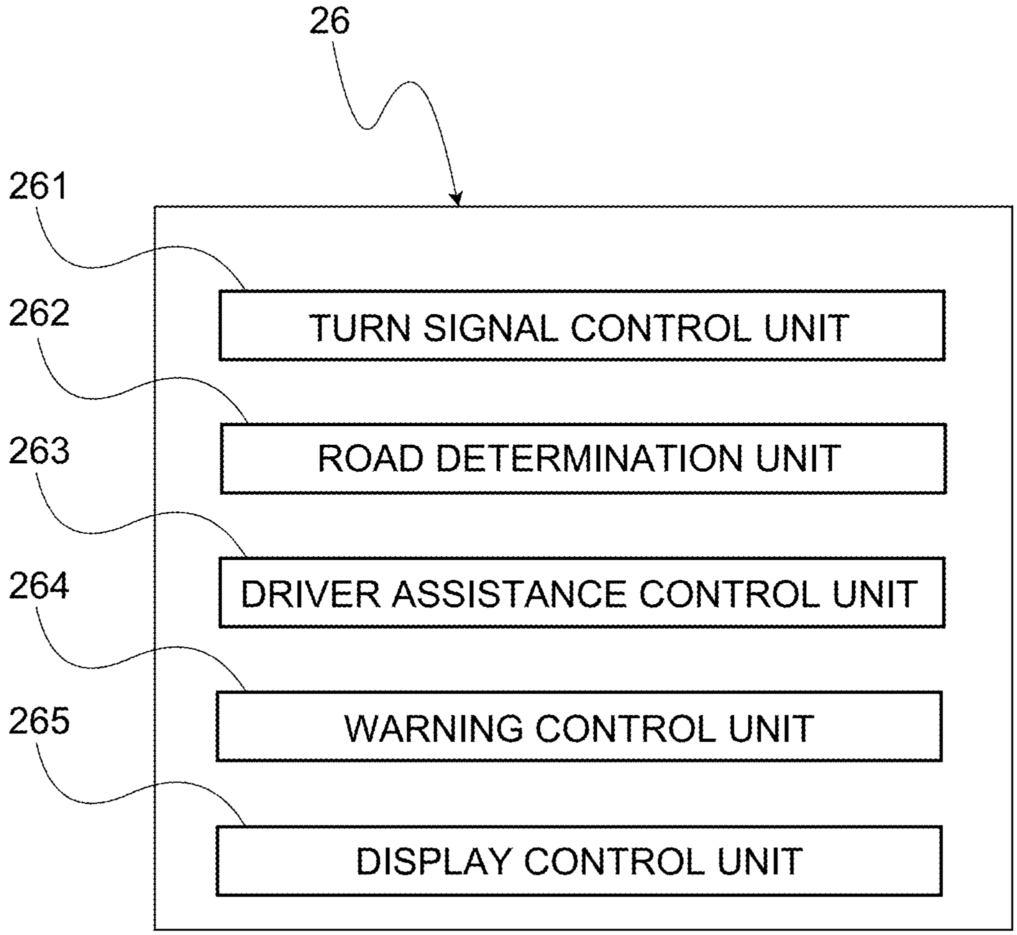
FIG. 4 is a functional block diagram of an ECU shown in FIG. 3.

In FIG. 4, an example of functional configurations of the ECU 26 is shown in a block diagram. The ECU 26 has, as functional configurations, a turn signal control unit 261, a road determination unit 262, a driver assistance control unit 263, a warning control unit 264, and a display control unit 265. The turn signal control unit 261, the road determination unit 262, the driver assistance control unit 263, the warning control unit 264, and the display control unit 265 are realized by the CPU 26A reading and executing programs stored in the ROM 26B.

The turn signal control unit 261 controls the turn signals 22L, 22R in accordance with the position of the turn signal lever 20. That is, when the turn signal lever 20 is in the LCA operation position P1L or the lighting position P2L, the left turn signal 22L is lit up by the control of the turn signal control unit 261. Furthermore, when the turn signal lever 20 is in the LCA operation position P1R or the lighting position P2R, the right turn signal 22R is lit up by the control of the turn signal control unit 261.

The road determination unit 262 identifies the road on which the vehicle 12 is traveling based on the map data of the navigation system (navigation application) and the position information relating to the vehicle 12 received from the GPS receiver 21. For example, the road determination unit 262 identifies whether the road on which the vehicle 12 is traveling is an expressway or an ordinary road. The road determination unit 262 also identifies the number of lanes there are in predetermined areas that are parts of areas of the road on which the vehicle 12 is traveling and include the current position of the vehicle 12. Moreover, when the road on which the vehicle 12 is traveling has multiple lanes, the road determination unit 262 identifies the lane in which the vehicle 12 is traveling. It will be noted that the vehicle 12 of the present embodiment drives on roads in countries having rules prescribing that vehicles drive on the left side of the road.

When the driver assistance operation device 25 is in the ON state, the driver assistance control unit 263 utilizes a sensor group (not shown in the drawings) and an actuator group (not shown in the drawings) provided in the vehicle 12 to cause the vehicle 12 to execute driver assistance control at a driving level among levels 1 to 5 defined by the Society of Automotive Engineers (SAE) (American Society of Automotive Engineers). Moreover, when the driver assistance operation device 25 is in the ON state, the occupant of the vehicle 12 can, by operating the driver assistance operation device 25, select the driving level and the driver assistance control to execute. The driver assistance control of the present embodiment includes, for example, adaptive cruise control (ACC), lane tracing assist control (LTA; lane keep assist), and lane change assistance control (LCA). The sensor group provided in the vehicle 12 includes, for example, a millimeter-wave radar sensor that sends probing waves and receives reflected waves, a laser imaging detection and ranging (LIDAR) sensor that scans in the forward direction of the vehicle 12, and cameras that capture images of subjects in the area around the vehicle 12. The actuator group provided at the vehicle 12 includes an electric actuators of a brake device and an electric steering device having the steering wheel 18, an electric actuator for driving an internal combustion engine, which is a drive source, and an electric motor, which is a drive source.

Here, LCA will be briefly described. LCA is, like LTA, lateral direction (lane width direction) position control relative to the lane of the vehicle 12. LCA is started when lever 1 to 3 driver assistance control has been selected and the turn signal lever 20 has been moved to the LCA operation position P1L or the LCA operation position P1R during implementation of LTA and ACC. When LTA and ACC are being executed, the CPU 26A (the driver assistance control unit 263) monitors the area around the vehicle 12 based on information acquired from the sensor group. Moreover, the CPU 26A executes LCA when the turn signal lever 20 is moved to the LCA operation position P1L or the LCA operation position P1R in a state in which it is determined that the vehicle 12 can safely execute a lane change. When LCA is executed, the actuator group is controlled so that the vehicle 12 moves from a travel lane, which is the lane in which the vehicle 12 is currently traveling, to a lane different from the travel lane. The LCA of the present embodiment includes first lane change assistance control (first LCA) and second lane change assistance control (second LCA).

The first LCA is control that moves the vehicle 12 from the travel lane to an adjacent lane, which is a lane next to the travel lane, after it has been determined that the vehicle 12 can be safely moved from the travel lane to the adjacent lane. The driver assistance control unit 263 executes the first LCA when the driver assistance operation device 25 is in the ON state and the turn signal lever 20 is positioned in the LCA operation position P1L or the LCA operation position P1R for a period of time less than a first threshold value and equal to or greater than a predetermined value. For example, the predetermined value is 1 second and the first threshold value is 2 seconds. When the turn signal lever 20 is positioned in the LCA operation position P1L, the vehicle 12 moves from the travel lane to the adjacent lane directly to the left of the travel lane, and when the turn signal lever 20 is positioned in the LCA operation position P1R, the vehicle 12 moves from the travel lane to the adjacent lane directly to the right of the travel lane. Hereinafter, the operation of positioning the turn signal lever 20 in the LCA operation position P1L or the LCA operation position P1R for a period of time less than the first threshold value and equal to or greater than the predetermined value when the driver assistance operation device 25 is in the ON state will be called a "first operation".

The second LCA is control that moves the vehicle 12 from the travel lane to the adjacent lane after it has been determined that the vehicle 12 can be safely moved to the adjacent lane and moves the vehicle 12 from the adjacent lane to a distant lane after it has been determined that the vehicle 12 can be safely moved to the distant lane. Here, the distant lane is a lane on the opposite side of the travel lane across the adjacent lane. The driver assistance control unit 263 executes the second LCA when the driver assistance operation device 25 is in the ON state and the turn signal lever 20 is positioned in the LCA operation position P1L or the LCA operation position P1R for a period of time equal to or greater than the first threshold value. When the turn signal lever 20 is positioned in the LCA operation position P1L, the vehicle 12 moves from the travel lane to the distant lane on the left side of the travel lane, and when the turn signal lever 20 is positioned in the LCA operation position P1R, the vehicle 12 moves from the travel lane to the distant lane on the right side of the travel lane. Hereinafter, the operation of positioning the turn signal lever 20 in the LCA operation position P1L or the LCA operation position P1R for a period of time equal to or greater than the first threshold value when the driver assistance operation device 25 is in the ON state will be called a "second operation".

It will be noted that the driver assistance control unit 263 interrupts the LCA when a predetermined interrupt condition is met during execution of the LCA. For example, the interrupt condition is met when the driver assistance control unit 263 determines that a predicted time (TTC) until the vehicle 12 collides with another vehicle is less than a predetermined threshold value during execution of the LCA.

The warning control unit 264 causes the display 23 and the speaker 24 to execute a predetermined warning operation when a warning condition described later is met.

The display control unit 265 can cause various images relating to the LCA to be displayed in an LCA display area 23A, which is part of the area of the display 23.

Figure 8:
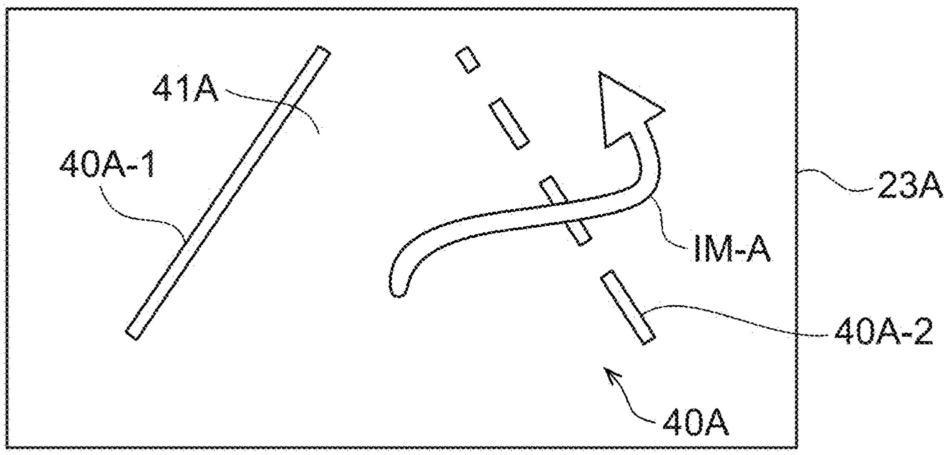
FIG. 8 is a view showing a display when it is determined that LCA is executable.

For example, when the LTA and the ACC are being executed and it has been determined that the vehicle 12 can safely execute a lane change, the display control unit 265 causes a road image 40A and a travel trajectory image IM-A to be displayed in the LCA display area 23A shown in FIG. 1 and FIG. 8. The road image 40A includes a travel lane image 41A representing the travel lane and a lane marking image 40A-1 and a lane marking image 40A-2 representing lane markings. The travel trajectory image IM-A represents the direction of an executable lane change. The contrast between the road image 40A and travel trajectory image IM-A in the LCA display area 23A and images in the vicinity thereof is low, and for that reason the visibility of the road image 40A and the travel trajectory image IM-A is low.

Figure 9:
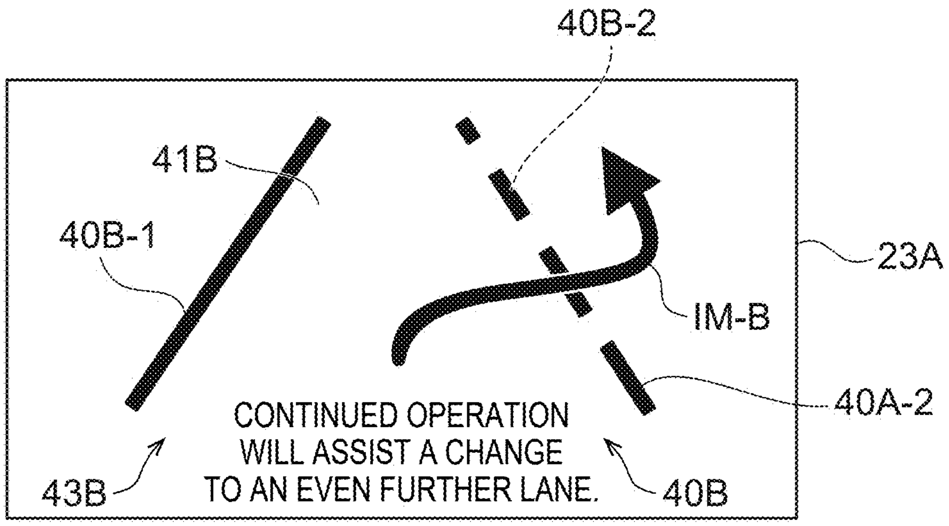
FIG. 9 is a view showing a display when a first operation has been executed.

Furthermore, when the first operation has been executed in a state in which the image of FIG. 8 is displayed, the display control unit 265 causes a road image 40B, a travel trajectory image IM-B, and a notification image 43B shown in FIG. 9 to be displayed in the LCA display area 23A. The road image 40B includes a travel lane image 41B representing the travel lane and lane marking images 40B-1, 40B-2 representing lane markings. The travel trajectory image IM-B represents the direction of a lane change during execution. The notification image 43B is a character image for notifying the driver that it has been determined that a lane change to the distant lane can be safely executed. The contrast between the road image 40B, travel trajectory image IM-B, and notification image 43B in the LCA display area 23A and images in the vicinity thereof is higher than the contrast in FIG. 8, and for that reason the visibility of the road image 40B, the travel trajectory image IM-B, and the notification image 43B is good.

Figure 10:
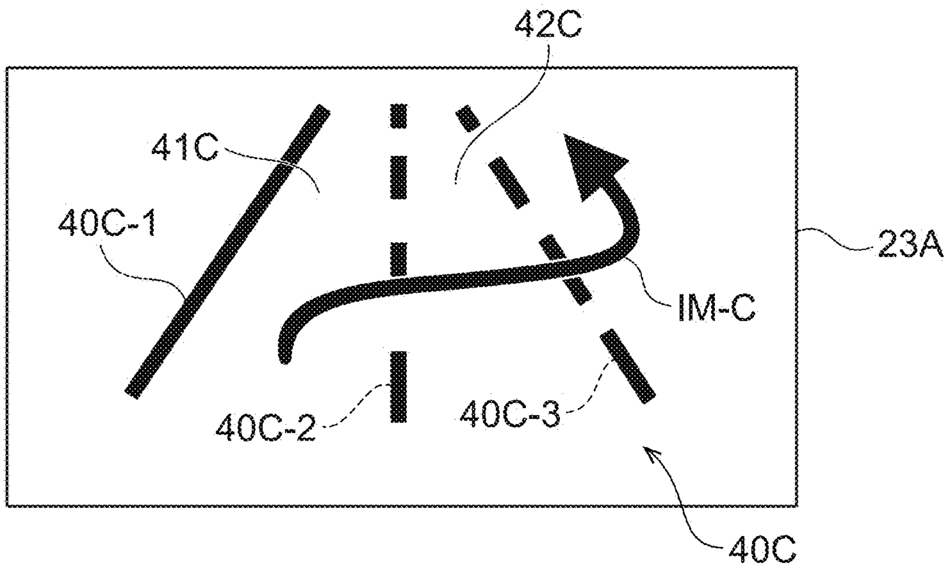
FIG. 10 is a view showing a display when a second operation has been executed.

Furthermore, when the second operation has been executed, the display control unit 265 causes a road image 40C and a travel trajectory image IM-C shown in FIG. 10 to be displayed in the LCA display area 23A. The road image 40C includes a travel lane image 41C representing the travel lane, an adjacent lane image 42C representing the adjacent lane, and lane marking images 40C-1, 40C-2, 40C-3 representing lane markings. The travel trajectory image IM-C represents the direction of a lane change during execution. The contrast between the road image 40C and travel trajectory image IM-C in the LCA display area 23A and images in the vicinity thereof is higher than the contrast in FIG. 8, and for that reason the visibility of the road image 40C and the travel trajectory image IM-C is good.

The turn signal lever 20, the GPS receiver 21, the driver assistance operation device 25, the ECU 26, the sensor group, and the actuator group are constituent elements of the vehicle control device 10.

Action and Effects

Next, the action and effects of the present embodiment will be described.

Next, processes executed by the CPU 26A of the ECU 26 will be described. The CPU 26A repeatedly executes the processes in the flowchart shown in FIG. 11 each time a predetermined amount of time elapses.

Figure 5:
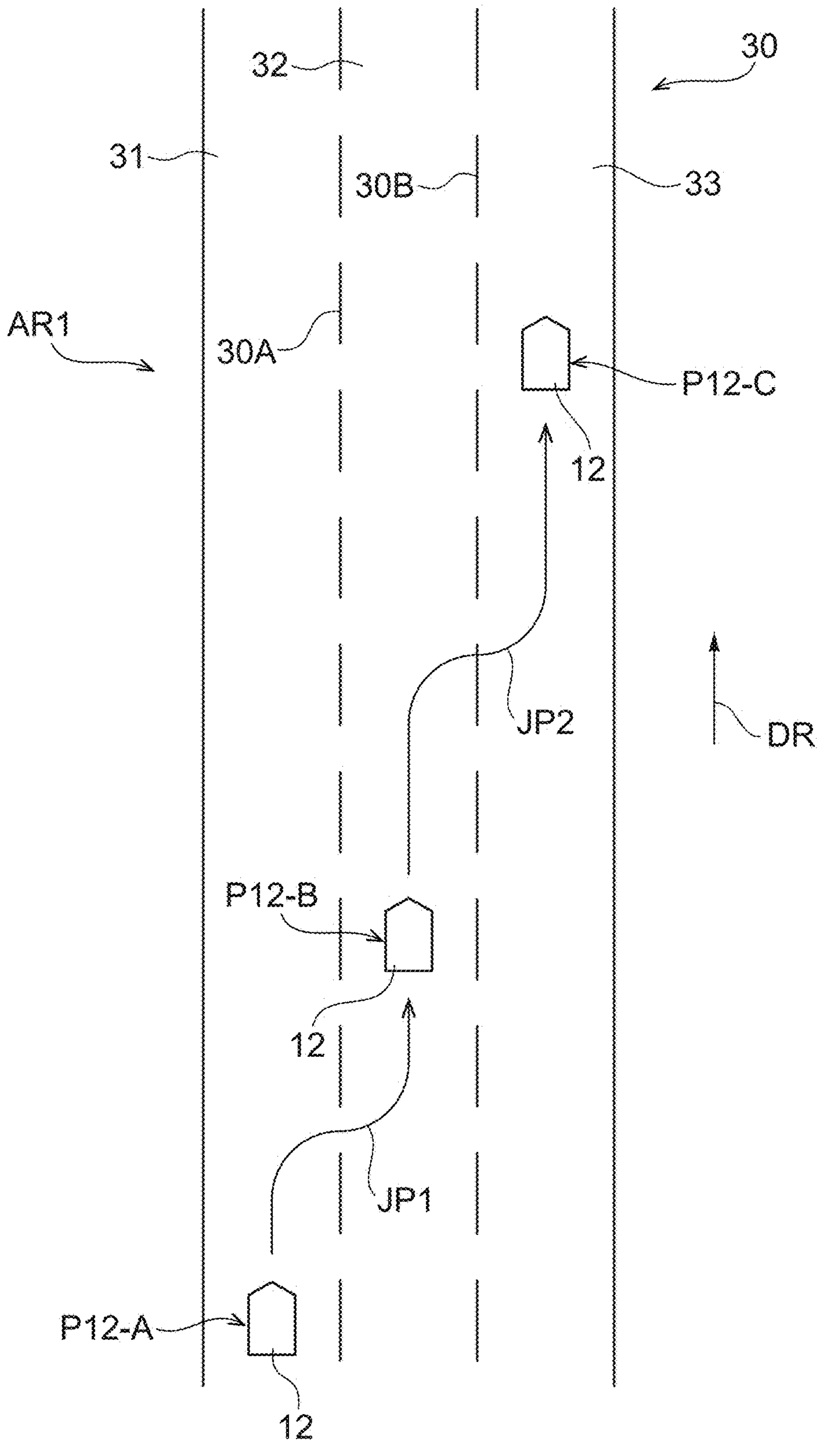
FIG. 5 is a schematic plan view showing the vehicle shown in FIG. 1 and a first predetermined area of an expressway on which the vehicle is traveling.
Figure 6:
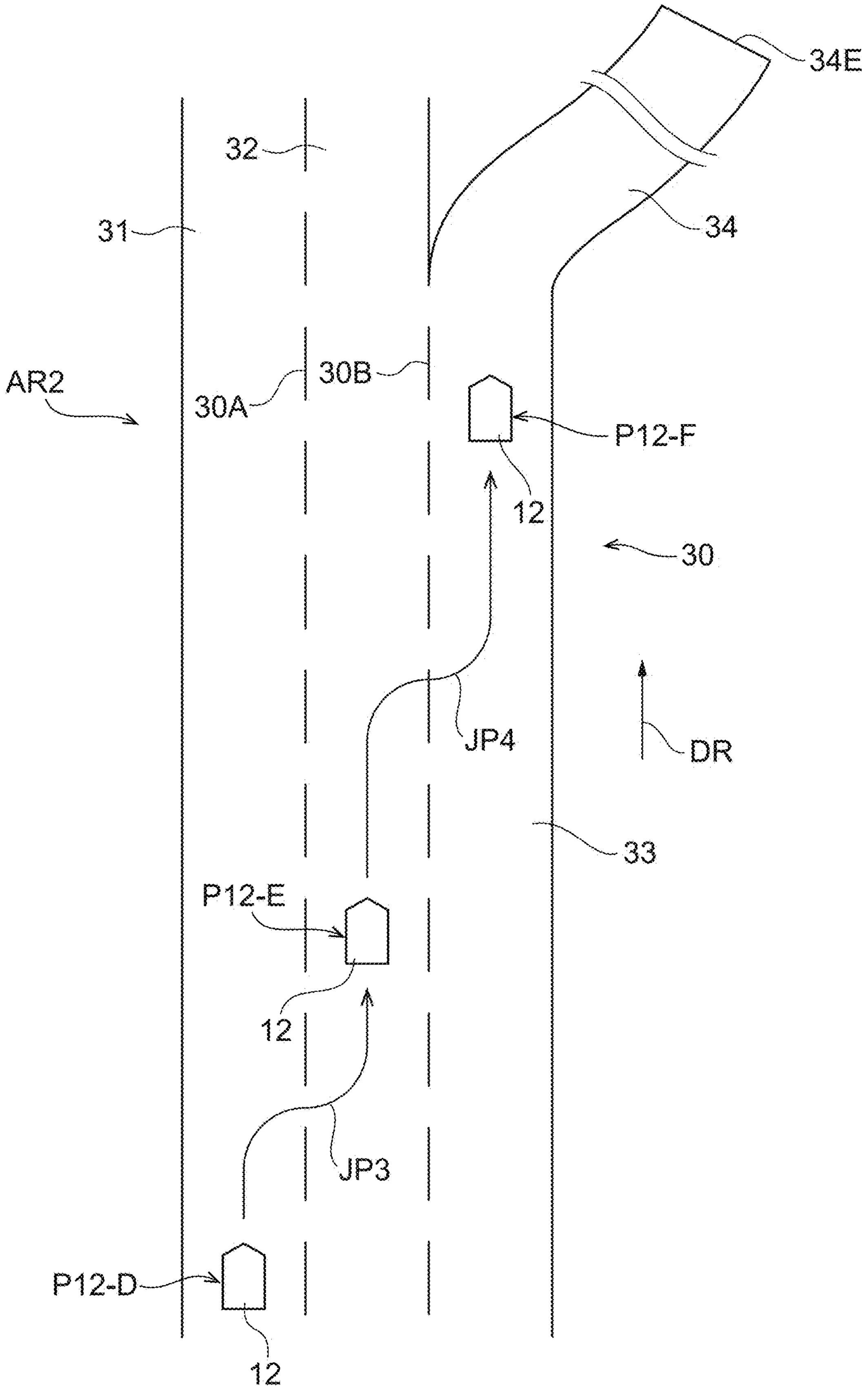
FIG. 6 is a schematic plan view showing the vehicle and a second predetermined area of the expressway on which the vehicle is traveling.
Figure 7:
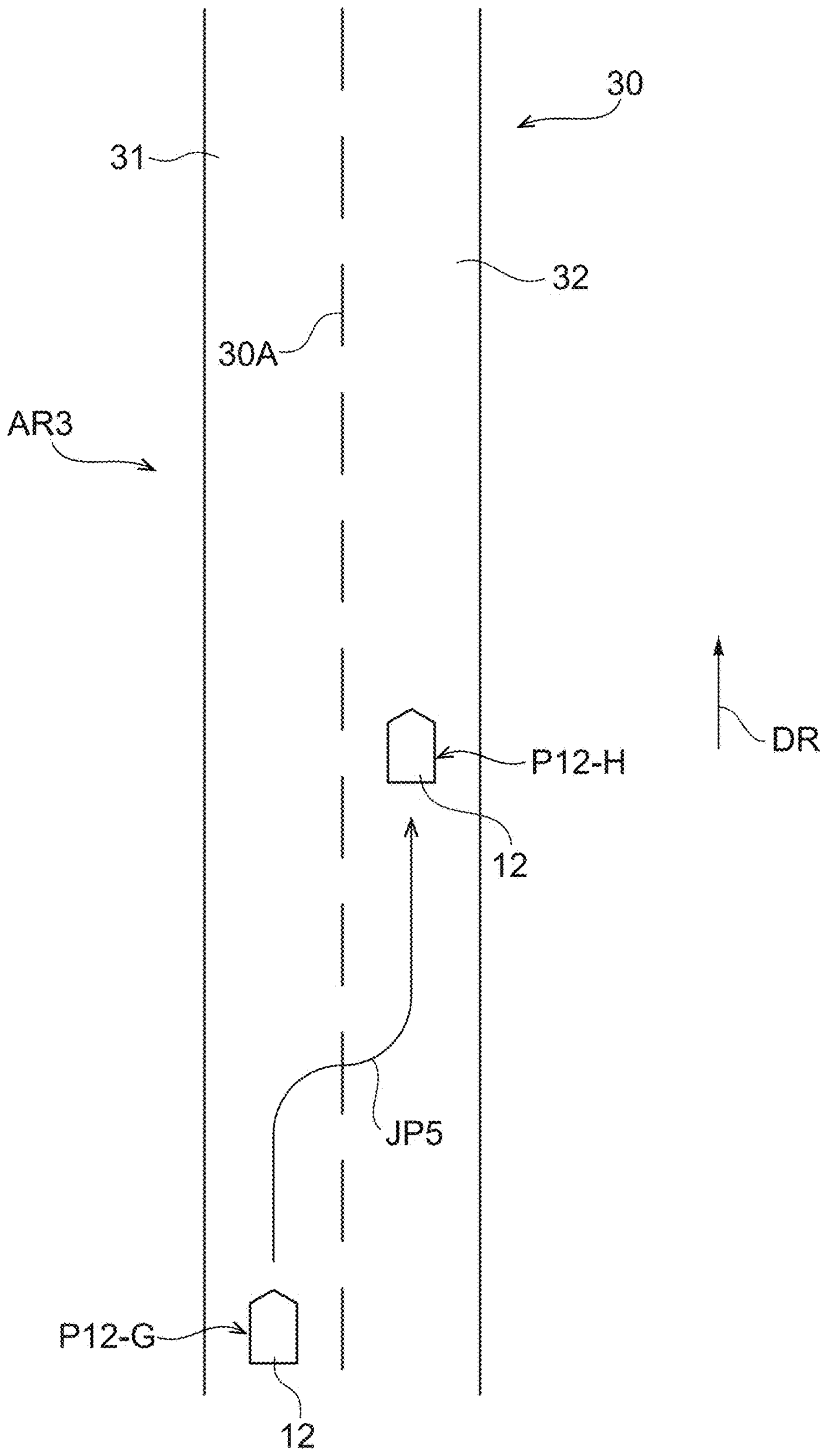
FIG. 7 is a schematic plan view showing the vehicle and a third predetermined area of the expressway on which the vehicle is traveling.

It will be assumed that the vehicle 12 is traveling on a road 30 shown in FIG. 5 to FIG. 7. The road 30 is an expressway and has a first lane 31, a second lane 32, and a third lane 33. The first lane 31 and the second lane 32 are demarcated by a lane marking 30A, and the second lane 32 and the third lane 33 are demarcated by a lane marking 30B. However, the number of lanes differs by area of the road 30. That is, in a first predetermined area AR1 shown in FIG. 5, the road 30 includes the first lane 31, the second lane 32, and the third lane 33. In a second predetermined area AR2 shown in FIG. 6, the road 30 includes the first lane 31, the second lane 32, and the third lane 33, and the third lane 33 is connected to a connecting lane 34. The end of the connecting lane 34 is provided with an exit 34E. The exit 34E connects the road 30 to an ordinary road (not shown in the drawings) that is a road different from the road 30. In a third predetermined area AR3 shown in FIG. 7, the road 30 includes only the first lane 31 and the second lane 32. It will be noted that arrow DR shown in FIG. 5 to FIG. 7 indicates the direction of travel of the vehicle 12.

In step S10 (hereinafter, the word "step" will be omitted), the CPU 26A determines whether or not the vehicle 12 is traveling on an expressway. In this case, the CPU 26A makes a YES determination and proceeds to S11.

In S11, the CPU 26A sets the value of a road flag to "1". The initial value of the road flag is "0".

It will be noted that if the vehicle 12 is traveling on an ordinary road, the CPU 26A makes a NO determination in S10, proceeds to S12, and sets the value of the road flag to "0".

The CPU 26A that has finished the process of S11 or S12 proceeds to S13 and determines whether or not the number of lanes included in the predetermined area in which the vehicle 12 is traveling is "1". As mentioned above, the road 30 has multiple lanes in all areas. For that reason, the CPU 26A makes a NO determination in S13 and proceeds to S14.

In S14, the CPU 26A determines whether or not the first operation has been performed.

When the CPU 26A makes a YES determination in S14, the CPU 26A proceeds to S15 and determines whether or not there is an adjacent lane in the direction represented by the direction in which the turn signal lever 20 was operated. For example, suppose that the vehicle 12 is traveling in the first lane 31 of the first predetermined area AR1 shown in FIG. 5 or the first lane 31 in the second predetermined area AR2 shown in FIG. 6. That is, suppose that the vehicle 12 is positioned in position P12-A in FIG. 5 or position P12-D in FIG. 6. The travel lane in this case is the first lane 31, and the adjacent lane is the second lane 32. For that reason, when the first operation has been performed so that the turn signal lever 20 is positioned in the LCA operation position P1R, the CPU 26A makes a YES determination in S15. In contrast, when the first operation has been performed so that the turn signal lever 20 is positioned in the LCA operation position P1L, the CPU 26A makes a NO determination in S15.

When the CPU 26A makes a YES determination in S15, the CPU 26A proceeds to S16 and executes the first LCA. For example, when the first LCA is executed in a state in which the vehicle 12 is positioned in position P12-A in FIG. 5, the vehicle 12 moves along a travel trajectory JP1 to position P12-B in the second lane 32. Furthermore, when the first LCA is executed in a state in which the vehicle 12 is positioned in position P12-D in FIG. 6, the vehicle 12 moves along a travel trajectory JP3 to position P12-E in the second lane 32.

When the CPU 26A finishes the process of S16 or makes a NO determination in S14 or S15, the CPU 26A proceeds to S17 and determines whether or not the second operation has been performed.

When the CPU 26A makes a YES determination in S17, the CPU 26A proceeds to S18 and determines whether or not there is a distant lane in the direction represented by the direction in which the turn signal lever 20 was operated. For example, suppose that the vehicle 12 is positioned in position P12-A in the first lane 31 in the first predetermined area AR1 shown in FIG. 5 or position P12-D in the first lane 31 in the second predetermined area AR2 shown in FIG. 6. The travel lane in this case is the first lane 31, the adjacent lane is the second lane 32, and the distant lane is the third lane 33. For that reason, when the second operation has been performed so that the turn signal lever 20 is positioned in the LCA operation position P1R, the CPU 26A makes a YES determination in S18. In contrast, when the second operation has been performed so that the turn signal lever 20 is positioned in the LCA operation position P1L, the CPU 26A makes a NO determination in S18.

When the CPU 26A makes a YES determination in S18, the CPU 26A proceeds to S19 and determines whether or not the value of the road flag is "1".

When the CPU 26A makes a YES determination in S19, the CPU 26A proceeds to S20 and determines whether or not the value of an exit flag is "0". It will be noted that the initial value of the exit flag is "0". Furthermore, when there is not a connecting lane 34 in the predetermined area in which the vehicle 12 is traveling, the CPU 26A sets the value of the exit flag to "0". In contrast, when there is a connecting lane 34 in the predetermined area in which the vehicle 12 is traveling, the CPU 26A sets the value of the exit flag to "1".

For example, suppose that the vehicle 12 is traveling in the first predetermined area AR1 shown in FIG. 5. There is no connecting lane 34 in the first predetermined area AR1. For that reason, in this case, the CPU 26A makes a YES determination in S20 and proceeds to S21.

In S21, the CPU 26A executes the second LCA. For example, when the second LCA is executed in a state in which the vehicle 12 is positioned in position P12-A in FIG. 5, the vehicle 12 moves along the travel trajectory JP1 to position P12-B in the second lane 32 and then moves along a travel trajectory JP2 to position P12-C in the third lane 33.

In contrast, suppose that the vehicle 12 is traveling in the second predetermined area AR2 shown in FIG. 6. There is a connecting lane 34 in the second predetermined area AR2. For that reason, in this case, the CPU 26A makes a NO determination in S20 and proceeds to S22. It will be noted that when the CPU 26A makes a NO determination in S20, the warning condition is met.

In S22, the CPU 26A causes the display 23 and the speaker 24 to execute a warning operation. In this case, the display 23 displays the characters, "If the second LCA is executed, your vehicle will proceed to the expressway exit, but is this alright?" Furthermore, the speaker 24 emits the audio, "If the second LCA is executed, your vehicle will proceed to the expressway exit, but is this alright?"

The CPU 26 that has finished the process of S22 executes the process of S17 again.

When the CPU 26A makes a NO determination in S18, the CPU 26A proceeds to S23. For example, when the vehicle 12 is traveling in the first lane 31 or the second lane 32 in the third predetermined area AR3 shown in FIG. 7, the CPU 26A makes a NO determination in S18.

The CPU 26A that has proceeded to S23 determines whether or not there is an adjacent lane in the direction represented by the direction in which the turn signal lever 20 was operated. For example, suppose that the vehicle 12 is traveling in the first lane 31 in the third predetermined area AR3 shown in FIG. 7. That is, suppose that the vehicle 12 is positioned in position P12-G in FIG. 7. The travel lane in this case is the first lane 31, and the adjacent lane is the second lane 32. For that reason, when the second operation is performed so that the turn signal lever 20 is positioned in the LCA operation position P1R, the CPU 26A makes a YES determination in S23. In contrast, when the second operation is performed so that the turn signal lever 20 is positioned in the LCA operation position P1L, the CPU 26A makes a NO determination in S23.

When the CPU 26A makes a YES determination in S23, the CPU 26A proceeds to S24 and executes the first LCA. For example, when the first LCA is executed in a state in which the vehicle 12 is positioned in position P12-G, the vehicle 12 moves along a travel trajectory JP5 to position P12-H in the second lane 32.

Figure 11:
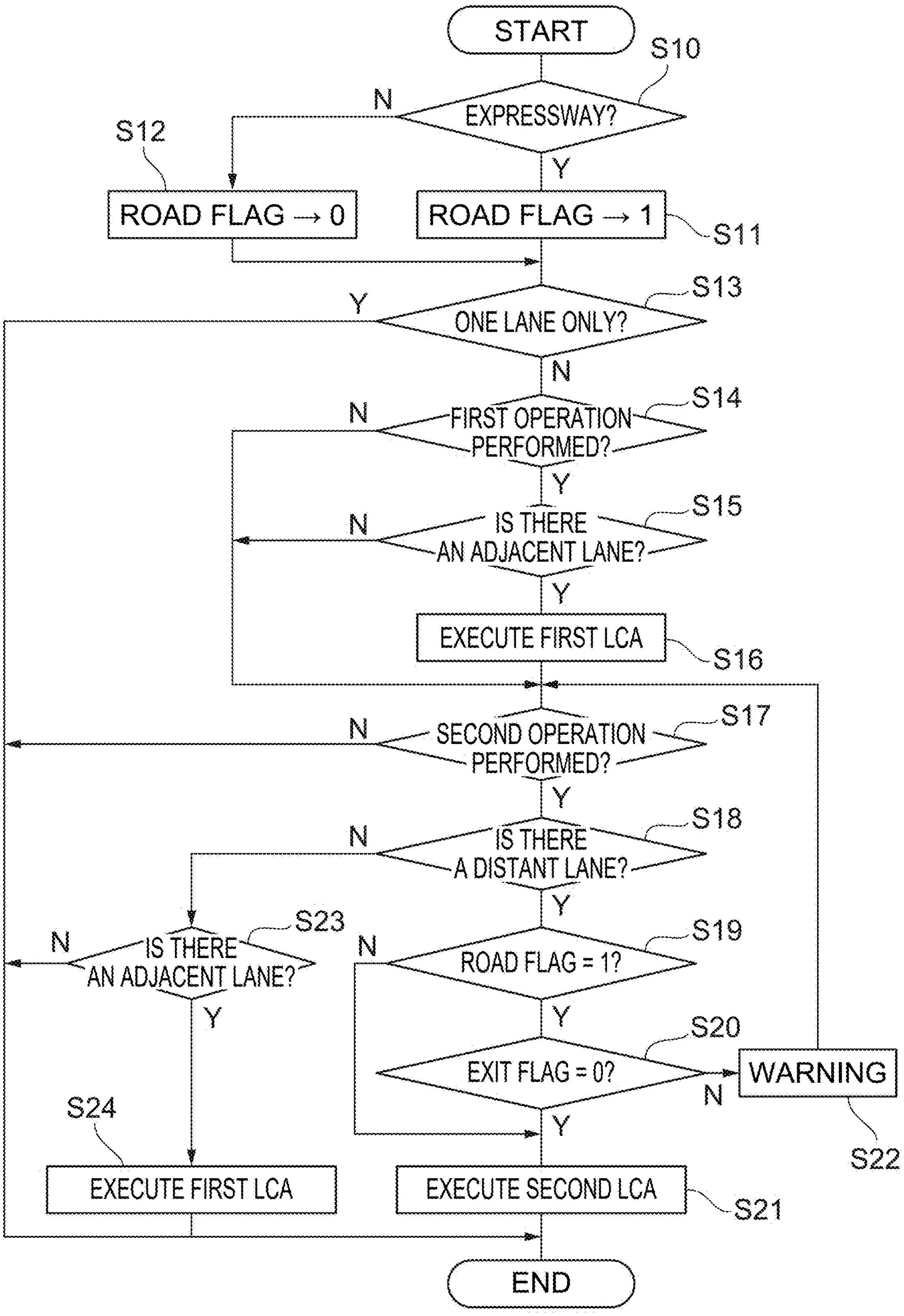
FIG. 11 is a flowchart showing processes executed by a CPU of the ECU.

When the CPU 26A makes a YES determination in S13, or makes a NO determination in S17 or S23, or finishes the process of S21 or S24, the CPU 26A temporarily ends the processes in the flowchart of FIG. 11.

As described above, in the present embodiment, when the first operation has been performed with respect to the turn signal lever 20, the CPU 26A (the driver assistance control unit 263) executes the first lane change assistance control that moves the vehicle 12 from the travel lane, which is the lane in which the vehicle 12 is traveling, to the adjacent lane. Furthermore, when the second operation different from the first operation has been executed with respect to the turn signal lever 20, the CPU 26A (the driver assistance control unit 263) executes the second lane change assistance control that moves the vehicle 12 from the travel lane to the distant lane. For that reason, when the driver wants the vehicle 12 to execute lane change assistance control over multiple lanes, the driver need only execute the second operation one time with respect to the turn signal lever 20 while the vehicle 12 is traveling in the travel lane. That is, according to the vehicle control device 10 of the present embodiment, the vehicle 12 can execute lane change assistance control over multiple lanes (the second LCA) without the driver having to operate the turn signal lever 20 after the lane change assistance control starts.

Moreover, when the second operation has been executed with respect to the turn signal lever 20 of the vehicle 12 traveling on the road 30 that is an expressway, the CPU 26A determines whether or not the distant lane (the third lane 33) is connected to the exit 34E of the road 30. Moreover, when the CPU 26A determines that the distant lane is connected to the exit 34E of the road 30, the display 23 and the speaker 24 issue a warning. In this way, the vehicle control device 10 of the present embodiment issues to the driver a warning asking the driver whether it is alright to drive the vehicle 12 toward the exit 34E when the second operation has been executed with respect to the turn signal lever 20 of the vehicle 12 traveling on the road 30 that is an expressway. Consequently, the driver receiving the warning can judge whether it is alright to continue to perform the second lane change assistance control as is.

Moreover, when the second operation has been executed with respect to the turn signal lever 20, the CPU 26A determines whether or not the predetermined area of the road 30 on which the vehicle 12 is traveling includes the adjacent lane and the distant lane. Moreover, when the CPU 26A determines that the predetermined area includes the adjacent lane but does not include the distant lane, the CPU 26A executes the first LCA so that the vehicle 12 moves to the adjacent lane. In this way, the vehicle control device 10 of the present embodiment can execute safe lane change assistance control taking into account misapprehensions relating to the lanes by the driver.

The vehicle control device 10, the vehicle control method, and the non-transitory recording medium pertaining to the embodiment have been described above, but these may be changed in design where appropriate without departing from the spirit of the present disclosure.

For example, as shown in FIG. 1, the steering wheel 18 may be provided with a handle switch (an operation member) (a switch) 19. The handle switch 19 is movable relative to the steering wheel 18 between an initial position, in which it projects to a large extent rearward from the surface of the steering wheel 18, and an operation position, in which it projects to a lesser extent than it does in the initial position. Moreover, the handle switch 19 is maintained in the initial position by the working of a spring member provided in the steering wheel 18 when no external force is applied to the handle switch 19. In this example modification, LCA is executed instead of LTA when the handle switch 19 is positioned in the operation position during implementation of LTA and ACC. More specifically, the driver assistance control unit 263 executes the first LCA when the handle switch 19 is positioned in the operation position for a period of time less than the first threshold value and equal to or greater than the predetermined value when the driver assistance operation device 25 is in the ON state. The operation of positioning the handle switch 19 in the operation position for a period of time less than the first threshold value and equal to or greater than the predetermined value when the driver assistance operation device 25 is in the ON state is a "first operation". For example, the predetermined value is 1 second and the first threshold value is 2 seconds. Furthermore, the driver assistance control unit 263 executes the second LCA when the driver assistance operation device 25 is in the ON state and the handle switch 19 is positioned in the operation position for a period of time equal to or greater than the first threshold value. The operation of positioning the handle switch 19 in the operation position for a period of time equal to or greater than the first threshold value when the driver assistance operation device 25 is in the ON state is a "second operation".

The road may have four or more lanes regardless of whether the road is an expressway or an ordinary road. Here, suppose that the road has four lanes and that the vehicle 12 is positioned in a travel lane that is the leftmost lane. In this case, the lane directly to the right of the travel lane is the adjacent lane, the lane directly to the right of the adjacent lane is a first distant lane (a distant lane), and the lane directly to the right of the first distant lane is a second distant lane (a distant lane). In this case also, the second LCA is executed when the second operation is performed on the handle switch 19 or the turn signal lever 20. Moreover, in this case, when the handle switch 19 or the turn signal lever 20 is positioned in the operation position for a period of time equal to or greater than the first threshold value and less than a second threshold value, the vehicle 12 may be moved from the travel lane to the first distant lane by LCA, and when the handle switch 19 or the turn signal lever 20 is positioned in the operation position for a period of time equal to or greater than the second threshold value, the vehicle 12 may be moved from the travel lane to the second distant lane by LCA. The second threshold value is, for example, 4 seconds.

The vehicle 12 may separately include an operation member for the first LCA and an operation member for the second LCA.

Moreover, the "first operation" may be an operation of moving the operation member one time to the operation position, and the "second operation" may be an operation of moving the operation member multiple times to the operation position within a predetermined amount of time. The predetermined amount of time is, for example, 1 second.

What is claimed is:

1. A vehicle control device including a processor which, when an operation member operable by an occupant of a vehicle has been operated, causes the vehicle to execute lane change assistance control, wherein the processor:

executes first lane change assistance control that moves the vehicle from a travel lane, which is a lane in which the vehicle is traveling, to an adjacent lane when a first operation has been executed with respect to the operation member;

executes second lane change assistance control that moves the vehicle from the travel lane to a distant lane, which is a lane on an opposite side of the adjacent lane from the travel lane, when a second operation different from the first operation has been executed with respect to the operation member; and determines, when the second operation has been executed with respect to the operation member of the vehicle while traveling on an expressway, whether or not a predetermined area of the expressway including a current position of the vehicle has an exit from the expressway and includes a connecting lane connected to the distant lane, wherein the vehicle control device further includes a warning generation device that issues a warning when the processor has determined that the predetermined area includes the connecting lane.

2. The vehicle control device of claim 1, wherein:

the operation member comprises a turn signal lever that is movable between an initial position and an operation position, the first operation is an operation of moving the turn signal lever to the operation position and positioning the turn signal lever in the operation position for a period of time less than a first threshold value and equal to or greater than a predetermined value, and the second operation is an operation of moving the turn signal lever to the operation position and positioning the turn signal lever in the operation position for a period of time equal to or greater than the first threshold value.

3. The vehicle control device of claim 1, wherein:

the operation member comprises a switch that is provided on a steering wheel of the vehicle and is movable between an initial position and an operation position, the first operation is an operation of moving the switch to the operation position and positioning the switch in the operation position for a period of time less than a first threshold value and equal to or greater than a predetermined value, and the second operation is an operation of moving the switch to the operation position and positioning the switch in the operation position for a period of time equal to or greater than the first threshold value.

4. The vehicle control device of claim 1, wherein:

the processor determines, when the second operation has been executed with respect to the operation member of the vehicle while traveling on a road, whether or not a predetermined area of the road including a current position of the vehicle includes the adjacent lane and the distant lane, and the processor causes the vehicle to execute the first lane change assistance control when it has determined that the predetermined area includes the adjacent lane but does not include the distant lane.

5. A vehicle control method, whereby a processor provided in a vehicle:

executes first lane change assistance control that moves the vehicle from a travel lane, which is a lane in which the vehicle is traveling, to an adjacent lane when a first operation has been executed with respect to an operation member operable by an occupant of the vehicle;

executes second lane change assistance control that moves the vehicle from the travel lane to a distant lane, which is a lane on an opposite side of the adjacent lane from the travel lane, when a second operation different from the first operation has been executed with respect to the operation member;

determines, when the second operation has been executed with respect to the operation member of the vehicle while traveling on an expressway, whether or not a predetermined area of the expressway including a current position of the vehicle has an exit from the expressway and includes a connecting lane connected to the distant lane; and issues a warning in a case in which the processor has determined that the predetermined area includes the connecting lane.

6. A non-transitory recording medium storing a program executable by a computer to perform processing, the processing comprising:

executing, when a first operation has been executed with respect to an operation member operable by an occupant of a vehicle, first lane change assistance control that moves the vehicle from a travel lane, which is a lane in which the vehicle is traveling, to an adjacent lane;

executing, when a second operation different from the first operation has been executed with respect to the operation member, second lane change assistance control that moves the vehicle from the travel lane to a distant lane, which is a lane on an opposite side of the adjacent lane from the travel lane;

determining, when the second operation has been executed with respect to the operation member of the vehicle while traveling on an expressway, whether or not a predetermined area of the expressway including a current position of the vehicle has an exit from the expressway and includes a connecting lane connected to the distant lane; and issuing a warning in a case in which the processor has determined that the predetermined area includes the connecting lane.

* * * * *